United States Patent
Yamamoto

(10) Patent No.: US 12,046,256 B2
(45) Date of Patent: Jul. 23, 2024

(54) DATA STORAGE DEVICE READ/WRITE CHANNEL WITH DIRECT RADIAL POSITION DEMODULATION IN ASYNCHRONOUS POSITION ERROR SIGNAL DEMODULATION

(71) Applicant: WESTERN DIGITAL TECHNOLOGIES, INC., San Jose, CA (US)

(72) Inventor: Satoshi Yamamoto, Hollister, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/232,113

(22) Filed: Aug. 9, 2023

(65) Prior Publication Data

US 2024/0135968 A1    Apr. 25, 2024

Related U.S. Application Data

(60) Provisional application No. 63/419,292, filed on Oct. 25, 2022.

(51) Int. Cl.
*G11B 5/596* (2006.01)
*G11B 5/56* (2006.01)

(52) U.S. Cl.
CPC ............ *G11B 5/59627* (2013.01); *G11B 5/56* (2013.01); *G11B 5/596* (2013.01); *G11B 5/59666* (2013.01)

(58) Field of Classification Search
None
See application file for complete search history.

(56) References Cited

U.S. PATENT DOCUMENTS

| | | | | |
|---|---|---|---|---|
| 5,089,757 A * | 2/1992 | Wilson | ............... | G11B 5/59616 |
| | | | | 360/77.02 |
| 5,717,538 A * | 2/1998 | Cheung | ................ | G11B 5/5526 |
| | | | | 360/77.02 |
| 5,966,258 A * | 10/1999 | Bliss | .................. | G11B 5/59622 |
| | | | | 360/67 |
| 6,181,505 B1 * | 1/2001 | Sacks | ................. | G11B 5/59605 |
| | | | | 360/29 |
| 6,195,220 B1 * | 2/2001 | Ellis | ...................... | G11B 5/5552 |
| 6,243,224 B1 * | 6/2001 | Sacks | ................. | G11B 5/59688 |
| 6,426,845 B1 * | 7/2002 | Sacks | ................. | G11B 5/59655 |
| 6,469,849 B1 * | 10/2002 | Ellis | ...................... | G11B 5/5552 |
| 7,158,333 B1 * | 1/2007 | Sutardja | ................. | G11B 5/556 |
| | | | | 360/32 |

(Continued)

*Primary Examiner* — Fred Tzeng
(74) *Attorney, Agent, or Firm* — Calderon Safran & Wright, PC

(57) ABSTRACT

Various illustrative aspects are directed to a data storage device, comprising one or more disks; an actuator mechanism configured to position one or more heads proximate to a corresponding disk surface of the one or more disks; and one or more processing devices. The one or more processing devices comprise read/write circuitry which comprises an asynchronous demodulation module. The asynchronous demodulation module is configured to receive demodulated null burst signals based on the selected head reading servo burst fields of the corresponding disk surface; and output, based on the demodulated null burst signals, a radial position signal, indicative of a radial position of the selected head.

20 Claims, 5 Drawing Sheets

(56) References Cited

U.S. PATENT DOCUMENTS

| | | | | |
|---|---|---|---|---|
| 7,583,469 B1* | 9/2009 | Sutardja | ............... | G11B 5/556 |
| | | | | 360/32 |
| 7,764,458 B1* | 7/2010 | Sutardja | ............... | G11B 5/556 |
| | | | | 360/32 |
| 7,835,094 B2* | 11/2010 | Bedillion | ............ | G11B 5/5965 |
| | | | | 360/48 |
| 8,134,796 B2* | 3/2012 | Bedillion | ............ | G11B 5/746 |
| | | | | 360/77.02 |
| 8,295,002 B1* | 10/2012 | Katchmart | ......... | G11B 5/59688 |
| | | | | 360/48 |
| 8,462,454 B1* | 6/2013 | Katchmart | ......... | G11B 5/59688 |
| | | | | 360/48 |
| 8,531,798 B1* | 9/2013 | Xi | .................... | G11B 5/59627 |
| | | | | 360/78.04 |
| 8,705,191 B1* | 4/2014 | Katchmart | ......... | G11B 5/59688 |
| | | | | 360/48 |
| 8,711,504 B1 | 4/2014 | Everett et al. | | |
| 2008/0267029 A1* | 10/2008 | Miles | ............... | G11B 5/455 |
| 2009/0310245 A1* | 12/2009 | Miles | ............... | G11B 5/59627 |
| | | | | 360/75 |

* cited by examiner

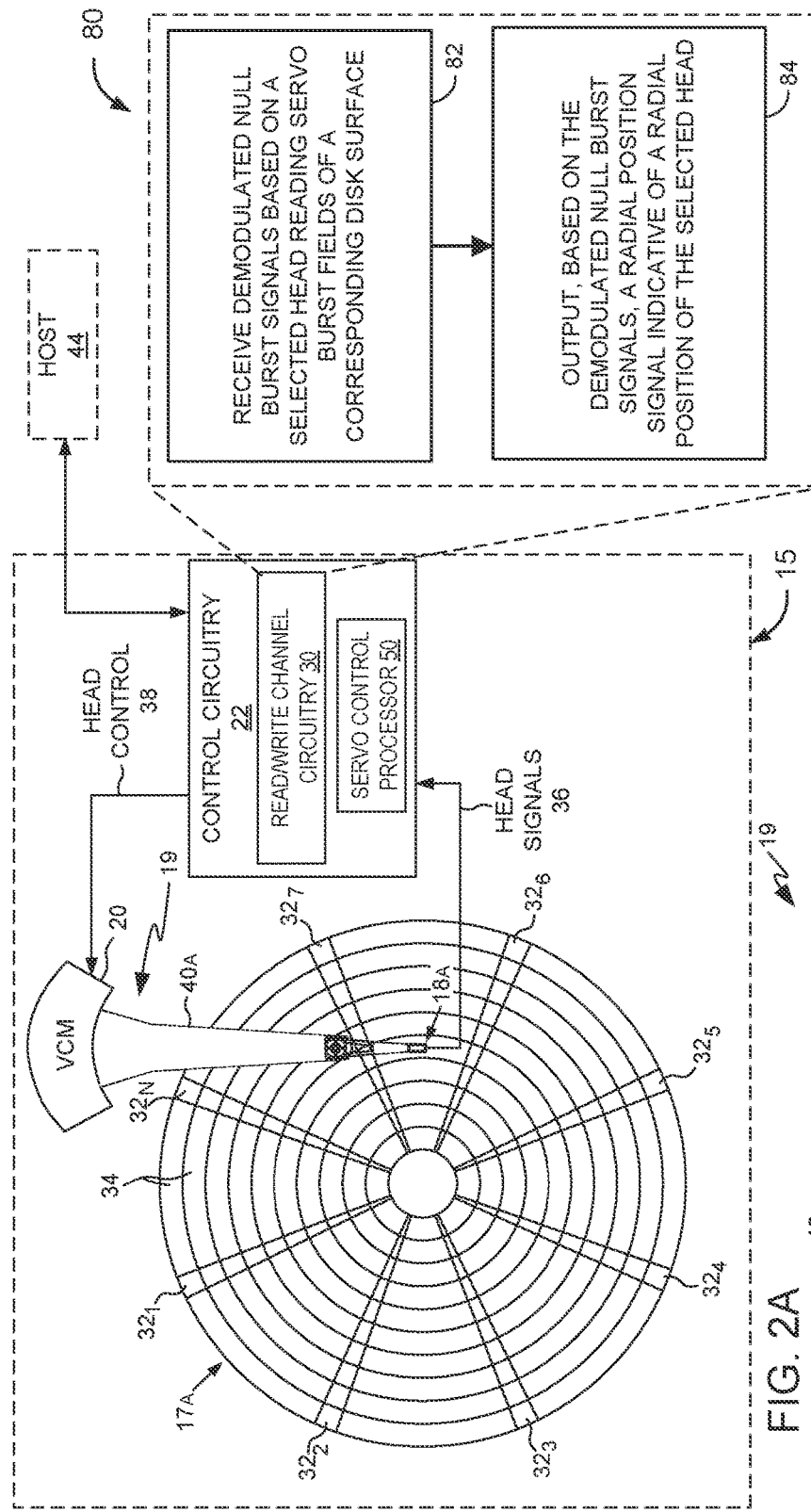
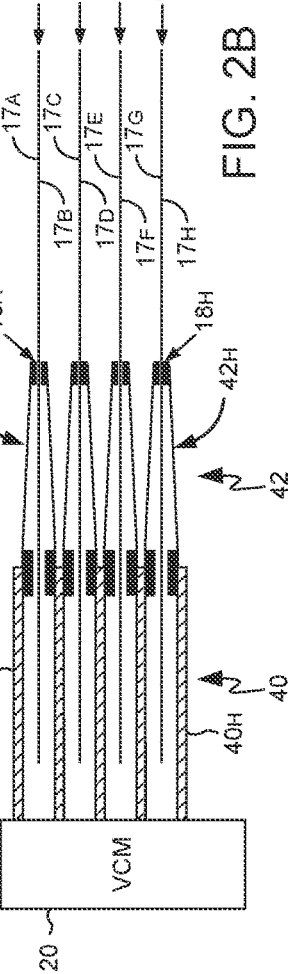

DATA STORAGE DEVICE READ/WRITE CHANNEL WITH DIRECT RADIAL POSITION DEMODULATION IN ASYNCHRONOUS POSITION ERROR SIGNAL DEMODULATION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine actuators, in some examples.

SUMMARY

Various examples disclosed herein provide data storage devices such as hard disk drives with control circuitry that includes novel and inventive read/write channel circuitry and servo control processor. Read/write channel circuitry of this disclosure may perform inventive operations beyond the scope of conventional read/write circuitry, including generating a radial position signal and null burst squared signals, based on demodulated null burst signals, in the read/write channel circuitry rather than in a servo control processor, including in asynchronous PES demodulation. Read/write channel circuitry performs direct radial position demodulation based on asynchronously sampled burst signals. Read/write channel circuitry thereby enables inventive advantages such as a smaller and faster servo control processor, and more accurate PES than is possible in conventional systems, in accordance with aspects of the present disclosure.

Various illustrative aspects are directed to a data storage device, comprising one or more disks; an actuator mechanism configured to position a selected head among one or more heads proximate to a corresponding disk surface among the one or more disks; and one or more processing devices. The one or more processing devices comprise read/write circuitry which comprises an asynchronous demodulation module. The asynchronous demodulation module is configured to receive demodulated null burst signals based on the selected head reading servo burst fields of the corresponding disk surface; and output, based on the demodulated null burst signals, a radial position signal, indicative of a radial position of the selected head.

Various illustrative aspects are directed to a method comprising receiving, by an asynchronous demodulation module of read/write channel circuitry of a data storage device, demodulated null burst signals based on a head reading servo burst fields of a corresponding disk surface of the data storage device. The method further comprises outputting, by the asynchronous demodulation module, based on the demodulated null burst signals, a radial position signal, indicative of a radial position of the head.

Various illustrative aspects are directed to one or more processing devices comprising an asynchronous demodulation module of read/write channel circuitry of a data storage device. The asynchronous demodulation module comprises means for receiving demodulated null burst signals based on a head reading servo burst fields of a corresponding disk surface of the data storage device. The asynchronous demodulation module further comprises means for outputting, based on the demodulated null burst signals, a radial position signal, indicative of a radial position of the head.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

FIG. 2C depicts a flowchart for an example method that read/write channel circuitry of control circuitry of a disk drive may perform or execute in controlling the operations of the disk drive, including for receiving demodulated null burst signals, and outputting, based on the demodulated null burst signals, a radial position signal, in accordance with aspects of the present disclosure.

DETAILED DESCRIPTION

Figure 1:
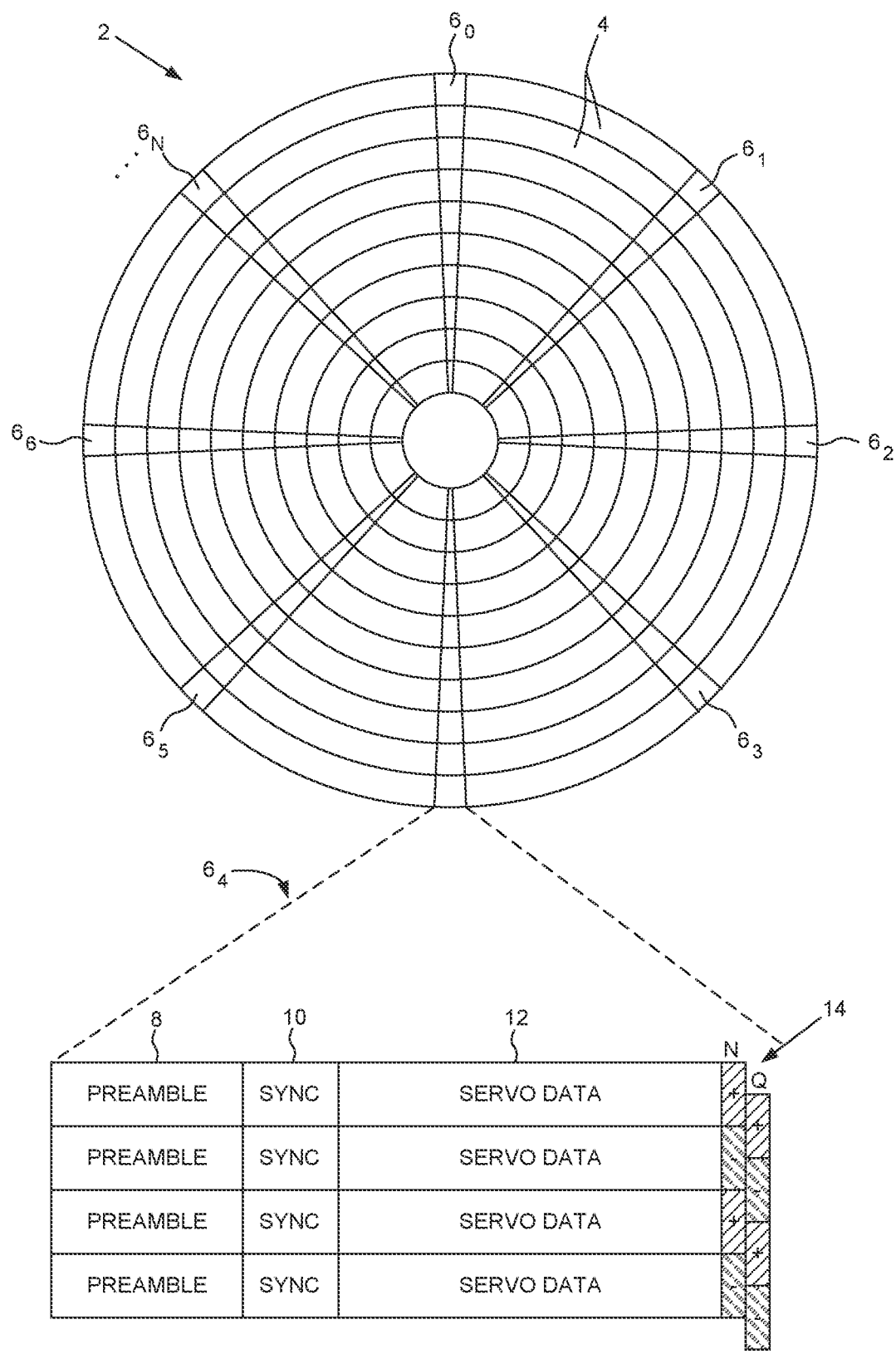
FIG. 1 shows a prior art disk format as comprising a number of radially-spaced, concentric servo tracks defined by servo wedges recorded around the circumference of each servo track.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). Control circuitry 22 comprises read/write channel circuitry 30 and a servo control processor 50. FIG. 2C depicts a flowchart for an example method 80 that read/write channel circuitry 30 of control circuitry 22 may perform or execute in controlling the operations of disk drive 15, in accordance with aspects of the present disclosure, including operations involved in servo control and providing processed servo signals to servo control processor 50 for servo control processor 50 to generate position error signals (PES), and for receiving demodulated null burst signals, and outputting, based on the demodulated null burst signals, a radial position signal, in accordance with aspects of the present disclosure. Read/write channel circuitry 30 may perform inventive operations beyond the scope of conventional read/write circuitry, including generating a radial position signal, and null burst squared signals, thereby enabling inventive advantages such as a smaller and faster servo control processor 50, and more accurate PES than is possible in conventional systems, in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples. Each suspension assembly 42 suspends a slider at a distal end thereof, with one of read/write heads 18 ("heads 18") mounted on the slider.

Each of actuator arms 40 is thus configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a greatly simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges 32 1-32 N, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges 32 1-32 N and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In particular, read/write channel circuitry 30 of control circuitry 22 may receive demodulated null burst signals based on a selected head reading servo burst fields of a corresponding disk surface (82). Read/write channel circuitry 30 may further output, based on the demodulated null burst signals, a radial position signal, indicative of a radial position of the selected head (84). Control circuitry 22, including read/write channel circuitry 30 and servo control processor 50, may further perform additional actions, methods, and techniques, in accordance with various aspects including as further described herein.

Figure 3:
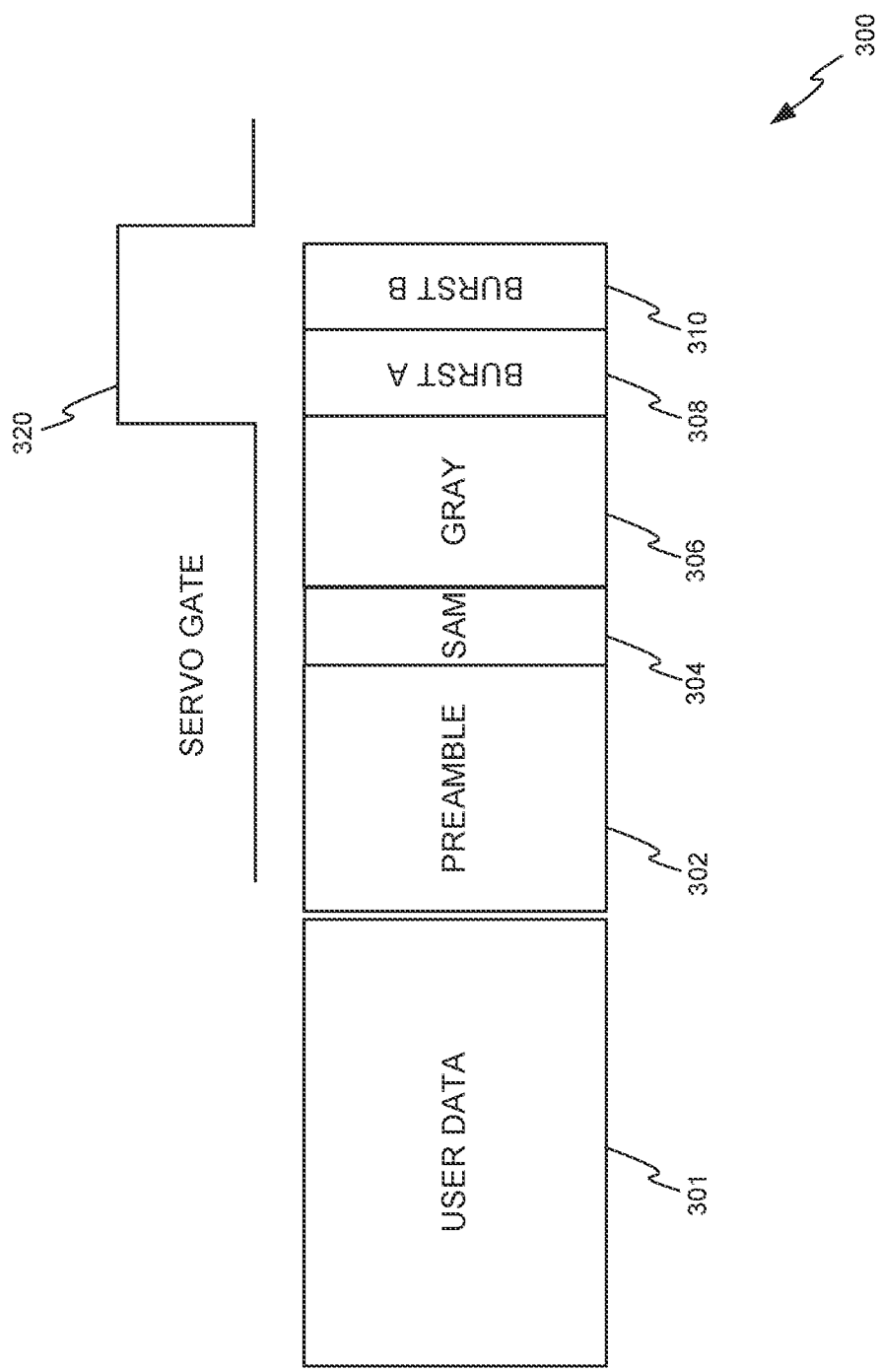
FIG. 3 illustrates a conceptual block diagram of a disk drive with further details of control circuitry, in accordance with aspects of the present disclosure.

FIG. 3 illustrates the fields in a selected servo ID (SID) 300, including a preamble 302, a Servo Address Mark (SAM) 304 used to synchronize data within the servo fields and provide timing information for write and read operations in the data portions of the disk, a Gray code 306 coarse track-ID (TID) number and additional information to identify the physical SID number, and A and B servo burst fields 308, 310, respectively, which provide read signals to support generating fractional-track Position Error Signal (PES). SID 300 is a gapless SID, which has user data 301 written all the way up adjacent to the preamble 302. Control circuitry 22 may be configured to implement gapless SIDS and sample the A and B servo burst fields 308, 310 asynchronously without first synchronizing to a preamble, and open the servo gate 320 just prior to the A and B servo burst fields 308, 310. This asynchronous servo burst field sampling provides the advantage of enabling more area of the track to be used for user data, but with the drawback of introducing a sampling timing phase error that is not present in synchronous servo burst field sampling.

Resolving the asynchronous sampling timing phase error would otherwise require several levels of substantial calculations by both the read/write channel circuitry 30 and then by the servo control processor 50 (as shown in FIG. 2A), requiring processing hardware and significant calculation time, but is greatly simplified in aspects of the present disclosure, which resolve asynchronous sampling timing phase error in read/write channel circuitry 30, with reduced hardware and faster speed than would otherwise be possible, among other inventive advantages. Read/write channel circuitry 30 of this disclosure is enabled to generate null burst squared signals and a radial position signal, e.g., $Burst(A)^2$, $Burst(B)^2$, and radial position x signals, respectively, to the servo control processor 50, enabling use of a simplified servo control processor 50 with reduced hardware requirements and faster speed than would otherwise be possible, among other inventive advantages, in various aspects of this disclosure.

Figure 4:
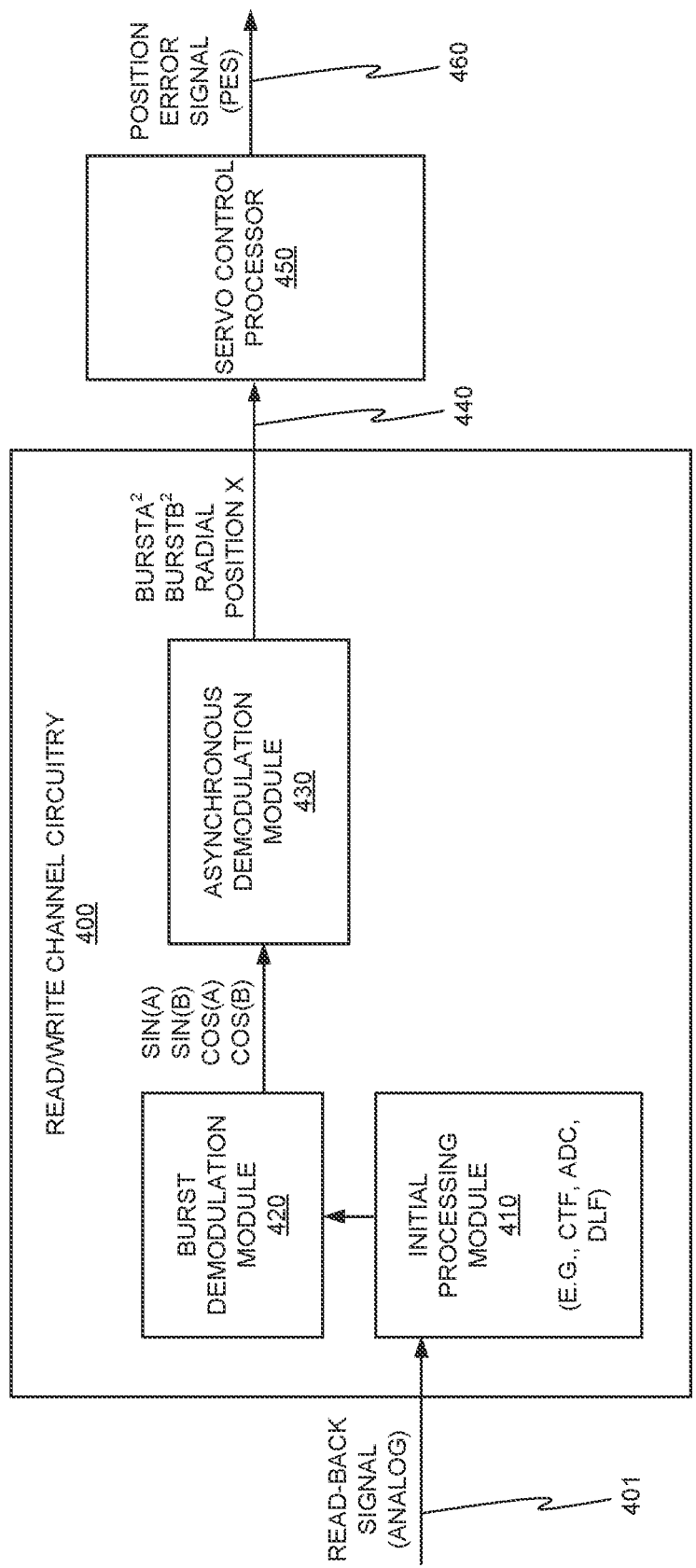
FIG. 4 depicts a conceptual block diagram of read/write channel circuitry and servo control processor, in accordance with aspects of the present disclosure.

FIG. 4 depicts a conceptual block diagram of read/write channel circuitry 400 and servo control processor 450, in accordance with aspects of the present disclosure. Read/write channel circuitry 400 and servo control processor 450 are an example implementation of read/write channel circuitry 30 and servo control processor 50 as shown in FIG. 2A and described above. Read/write channel circuitry 400 is configured to receive an analog read-back signal 401 from a head reading a corresponding disk surface, and to generate and output signals to servo control processor 450 as described herein.

Read/write channel circuitry 400 includes initial processing module 410, burst demodulation module 420, and asynchronous demodulation module 430. Initial processing module 410 may include analog and/or digital filters and other pre-processing components such as a continuous time filter (CTF), an analog-to-digital converter (ADC), and a digital linear filter (DLF), in various examples. Initial processing module 410 receives the analog read-back signal as input, and outputs a filtered, digital read-back signal based on the analog read-back signal. Burst demodulation module 420 receives the digital read-back signal as input, and outputs, to asynchronous demodulation module 430, demodulated null burst signals sine(A), sine(B), cosine(A), cosine(B) (i.e., sin(A), sin(B), cos(A), cos(B)), based on a selected head reading servo burst fields of the corresponding disk surface.

In various examples, sin(A) may be equal to a P servo burst signal, and sin(B) may be equal to a Q servo burst signal. In various examples, burst demodulation module 420 may output, and asynchronous demodulation module 430 may receive and process, any other pairs or sets of trigonometric functions of A and B or of other parameterizations of the original detected servo burst signals, which may provide equivalent functionality with the particular choices of trigonometric functions of servo burst signal demodulated null burst signals sin(A), sin(B), cos(A), cos(B) as in this example. Thus, in various examples, the demodulated null burst signals may include a first demodulated null burst signal based on a first trigonometric function of a first null burst signal, a second demodulated null burst signal based on a second trigonometric function of the first null burst signal, a third demodulated null burst signal based on the first trigonometric function of a second null burst signal, and a fourth demodulated null burst signal based on the second trigonometric function of the second null burst signal. In the example of FIG. 4, the first demodulated null burst signal based on the first trigonometric function of the first null burst signal comprises a sine(A) demodulated null burst signal, the second demodulated null burst signal based on the second trigonometric function of the first null burst signal comprises a sine(B) demodulated null burst signal, the third demodulated null burst signal based on the first trigonometric function of the second null burst signal comprises a cosine(A) demodulated null burst signal, and the fourth demodulated null burst signal based on the second trigonometric function of the second null burst signal comprises a cosine(B) demodulated null burst signal.

Asynchronous demodulation module 430 of read/write channel circuitry 400 receives demodulated null burst signals sin(A), sin(B), cos(A), and cos(B) from burst demodulation module 420 as inputs. Asynchronous demodulation module 430 determines and outputs BurstA$^2$ and BurstB$^2$ null burst squared signals, and a radial position x signal, based on and as functions of demodulated null burst signals sin(A), sin(B), cos(A), and cos(B). Asynchronous demodulation module 430 is configured to output BurstA$^2$ and BurstB$^2$ null burst squared signals and a radial position x signal as outputs of read/write channel circuitry 400.

BurstA$^2$ and BurstB$^2$ are examples of null burst squared signals. In various examples, asynchronous demodulation module 430 may generally be configured to output a first null burst squared signal and a second null burst squared signal based on the demodulated null burst signals. In the example of FIG. 4, the first null burst squared signal comprises a null BurstA$^2$ signal, as an example of a first null burst squared signal, and the second null burst squared signal comprises a null BurstB$^2$ signal, as an example of a second null burst squared signal.

Asynchronous demodulation module 430 of read/write channel circuitry 400 may include normalization of the burst signals, and automatic phase correction capability, eliminating the need for separate burst signal normalization calculations and phase correction calculations by the servo control processor. Asynchronous demodulation module 430 may also provide more accurate automatic phase correction capability than is possible in conventional systems, which may ensure more accurate PES output and better PES performance than is possible in conventional systems. Asynchronous demodulation module 430 may provide wider position coverage than in conventional read/write channels, and may cover a full servo track, thereby enabling fewer stitching points and simpler YMK (or servo raw position, or track number plus PES) position signal calculation by servo control processor 450, thus further enabling servo control processor 450 to be simpler and faster, in various examples.

Read/write channel circuitry 400 is connected via channel 440 to servo control processor 450. Servo control processor 450 is configured to receive the radial position x signal and the BurstA$^2$ and BurstB$^2$ null burst squared signals from asynchronous demodulation module 430. Servo control processor 450 is configured to output a position error signal (PES) based on the radial position x signal, the first null burst squared (BurstA$^2$) signal, and the second null burst squared (BurstB$^2$) signal.

Conventionally, read/write channel circuitry is incapable of generating outputs such as radial position x, and it is required for the servo control processor to perform processing to generate radial position x. In aspects of this disclosure, because read/write channel circuitry 400 generates outputs such as radial position x, read/write channel circuitry 400 enables servo control processor 450 to be simpler, smaller, and faster than in conventional systems. For example, read/write channel circuitry 400 eliminates the need for servo control processor 450 to have and to perform lookups in a phase profile model correction table per reader, or to be configured to perform a sine polynomial P/Q burst signal approximation calculation. Servo control processor 450 generates a position error signal (PES) based on its inputs from read/write channel circuitry 400, and from track number and target track inputs in various examples, and outputs the PES via PES output channel 460.

Figure 5:
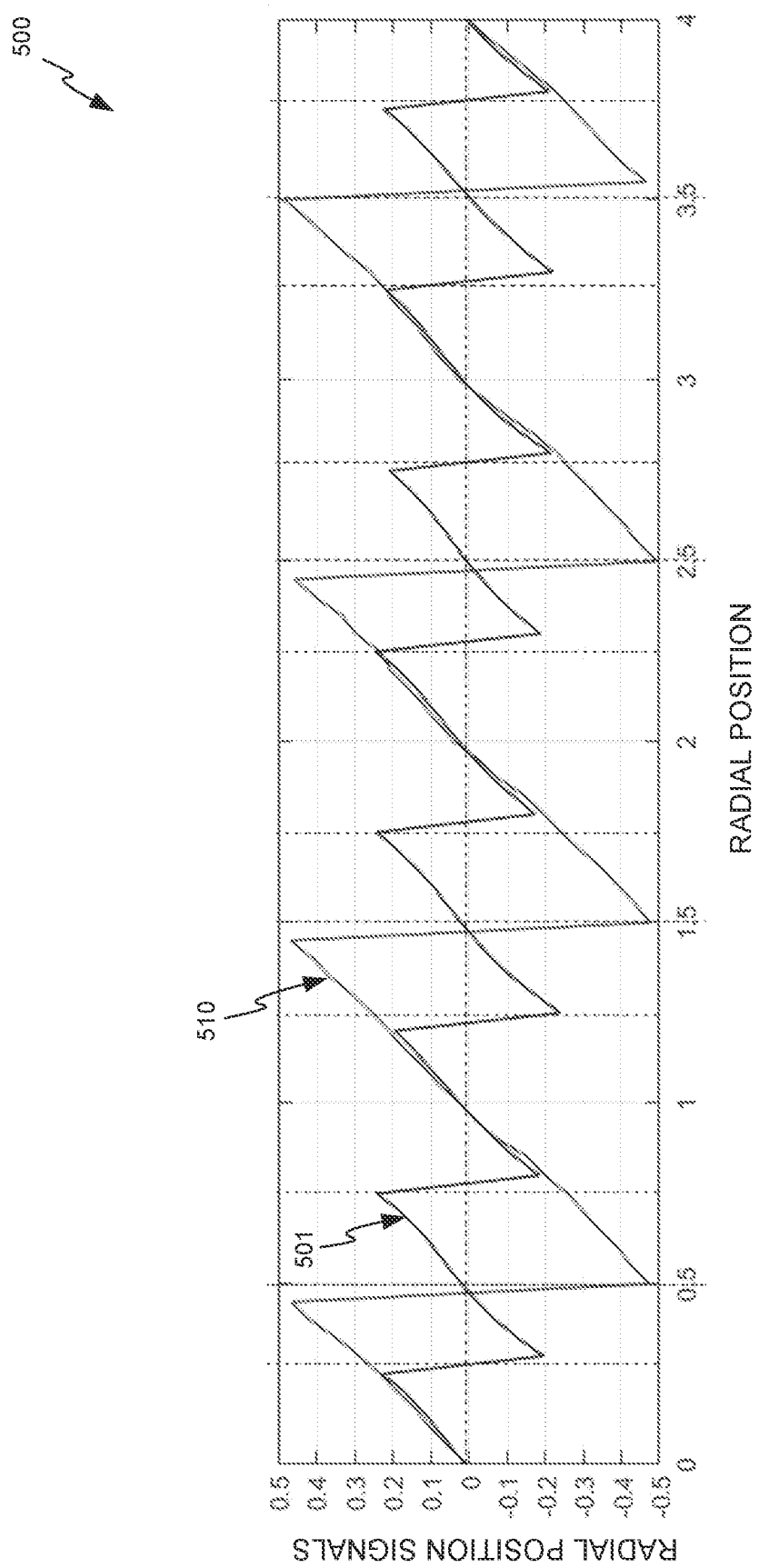
FIG. 5 shows a comparative graph of radial position signal cross-track profile of a normalized servo burst radial position signal over radial position generated by an asynchronous demodulation module based on the demodulated null burst signals, compared with a conventional position signal cross-track profile, in accordance with aspects of the present disclosure.

FIG. 5 shows a comparative graph 500 of radial position signal cross-track profile 510, of a normalized P/Q servo burst radial position signal (y axis) over radial position x (x axis) generated by asynchronous demodulation module 430 of FIG. 4 based on the demodulated null burst signals, contrasted with a conventional position signal cross-track profile 501, in accordance with aspects of the present disclosure. Whereas the conventional position signal 501 only covers half a servo track (−0.25 through +0.25), and has two required stitching points within the servo track, the radial position signal 510 generated by asynchronous demodulation module 430 of FIG. 4 covers a full servo track (−0.50 through +0.50), and is free of stitching points across substantially the entirety of the servo track (with the only stitching points approximately coinciding with the margins between servo tracks), in this example. This full servo track radial position signal coverage of the present disclosure enables inventive advantages such as requiring fewer stitching points for stitching PES components and simplifying a YMK (or track number plus PES) position signal calculation by the servo control processor, thus further enabling the servo control processor to be simpler and faster, in various examples. Asynchronous demodulation module 430 also inherently normalizes the servo burst position signal and so eliminates the need to perform a separate P/Q servo burst normalization calculation, in various examples.

Asynchronous demodulation module 430 may thus be configured to output radial position signal 510 such that radial position signal 510 covers substantially a full servo track, e.g., 0.5 to 1.5, 1.5 to 2.5, 2.5 to 3.5 along the x axis, indicating radial position, in FIG. 5. Radial position signal 510 may be considered to cover "substantially" the full servo track in that it covers the full servo track minus a small edge margin for transition (e.g., the near-vertical transitions proximate to the radial position track margins 0.5, 1.5, 2.5, 3.5 along the x axis in FIG. 5). Asynchronous demodulation module 430 is further configured to output radial position signal 510 such that radial position signal 510 covers the full servo track from a minus substantially half-track position signal to a plus substantially half-track position signal for the full servo track, corresponding to a minus substantially half-track position of the full servo track to a plus substantially half-track position of the full servo track. Asynchronous demodulation module 430 is further configured to output radial position signal 510 such that the radial position signal covers the full servo track with a single continuous position signal with a substantially continuous slope and free of stitching points within the radial position signal covering substantially the full servo track (e.g., in contrast to conventional position signal 501, which has near-vertical transition stitching points at minus and plus half a servo track (−0.25 and +0.25) in each servo track radial position range).

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprises logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator mechanism configured to position a selected head among one or more heads proximate to a corresponding disk surface among the one or more disks; and
   one or more processing devices comprising read/write circuitry, wherein the read/write circuitry comprises an asynchronous demodulation module configured to:
   receive demodulated null burst signals based on the selected head reading servo burst fields of the corresponding disk surface; and
   output, based on the demodulated null burst signals, a radial position signal, indicative of a radial position of the selected head.

2. The data storage device of claim 1, wherein the asynchronous demodulation module is further configured to output, based on the demodulated null burst signals, a first null burst squared signal and a second null burst squared signal.

3. The data storage device of claim 2, wherein the first null burst squared signal comprises a null BurstA$^2$ signal, and the second null burst squared signal comprises a null BurstB$^2$ signal.

4. The data storage device of claim 1, wherein the demodulated null burst signals comprise a first demodulated null burst signal based on a first trigonometric function of a first null burst signal, a second demodulated null burst signal based on a second trigonometric function of the first null burst signal, a third demodulated null burst signal based on the first trigonometric function of a second null burst signal, and a fourth demodulated null burst signal based on the second trigonometric function of the second null burst signal.

5. The data storage device of claim 4, wherein the first demodulated null burst signal based on the first trigonometric function of the first null burst signal comprises a sine(A) demodulated null burst signal, the second demodulated null burst signal based on the second trigonometric function of the first null burst signal comprises a sine(B) demodulated null burst signal, the third demodulated null burst signal based on the first trigonometric function of the second null burst signal comprises a cosine(A) demodulated null burst signal, and the fourth demodulated null burst signal based on the second trigonometric function of the second null burst signal comprises a cosine(B) demodulated null burst signal.

6. The data storage device of claim 1, wherein the one or more processing devices further comprise a servo control processor, wherein the servo control processor is configured to receive the radial position signal from the asynchronous demodulation module.

7. The data storage device of claim 6, wherein the asynchronous demodulation module is further configured to output a first null burst squared signal and a second null burst squared signal, and wherein the servo control processor is further configured to receive the first null burst squared signal and the second null burst squared signal from the asynchronous demodulation module.

8. The data storage device of claim 7, wherein the servo control processor is configured to output a position error signal (PES) based on the radial position signal, the first null burst squared signal, and the second null burst squared signal.

9. The data storage device of claim 1, wherein the asynchronous demodulation module is further configured to output the radial position signal such that the radial position signal covers substantially a full servo track.

10. The data storage device of claim 9, wherein the asynchronous demodulation module is further configured to output the radial position signal such that the radial position signal covers substantially the full servo track from a minus substantially half-track position signal to a plus substantially half-track position signal for the full servo track, corresponding to a minus substantially half-track position of the full servo track to a plus substantially half-track position of the full servo track.

11. The data storage device of claim 10, wherein the asynchronous demodulation module is further configured to output the radial position signal such that the radial position signal covers the full servo track with a single continuous position signal with a substantially continuous slope and free of stitching points within the radial position signal covering substantially the full servo track.

12. The data storage device of claim 1, wherein the read/write circuitry further comprises a burst demodulation module configured to output, to the asynchronous demodulation module, the demodulated null burst signals based on the selected head reading servo burst fields of the corresponding disk surface.

13. A method comprising:
   receiving, by an asynchronous demodulation module of read/write channel circuitry of a data storage device, demodulated null burst signals based on a head reading servo burst fields of a corresponding disk surface of the data storage device; and outputting, by the asynchronous demodulation module, based on the demodulated null burst signals, a radial position signal, indicative of a radial position of the head.

14. The method of claim 13, wherein the demodulated null burst signals comprise a sine(A) demodulated null burst signal, a sine(B) demodulated null burst signal, a cosine(A) demodulated null burst signal, and a cosine(B) demodulated null burst signal, the method further comprising outputting, by the asynchronous demodulation module, based on the demodulated null burst signals, a null BurstA$^2$ signal and a null BurstB$^2$ signal.

15. The method of claim 14, further comprising:

receiving, by a servo control processor, the radial position signal, the null BurstA$^2$ signal, and the null BurstB$^2$ signal from the asynchronous demodulation module; and outputting, by the servo control processor, a position error signal (PES) based on the radial position signal, the first null burst squared signal, and the second null burst squared signal.

16. The method of claim 13, further comprising outputting, by the asynchronous demodulation module, the radial position signal such that the radial position signal covers substantially a full servo track, from a minus substantially half-track position signal to a plus substantially half-track position signal for substantially the full servo track, corresponding to a minus substantially half-track position of the full servo track to a plus substantially half-track position of the full servo track, and such that the radial position signal is free of stitching points across substantially the full servo track.

17. One or more processing devices comprising an asynchronous demodulation module of read/write channel circuitry of a data storage device, the asynchronous demodulation module comprising:

means for receiving demodulated null burst signals based on a head reading servo burst fields of a corresponding disk surface of the data storage device; and means for outputting, based on the demodulated null burst signals, a radial position signal, indicative of a radial position of the head.

18. The one or more processing devices of claim 17, wherein the demodulated null burst signals comprise a sine(A) demodulated null burst signal, a sine(B) demodulated null burst signal, a cosine(A) demodulated null burst signal, and a cosine(B) demodulated null burst signal, and wherein the asynchronous demodulation module further comprises means for outputting, based on the demodulated null burst signals, a null BurstA$^2$ signal and a null BurstB$^2$ signal.

19. The one or more processing devices of claim 18, further comprising a servo control processor, wherein the a servo control processor comprises:

means for receiving the radial position signal, the null BurstA$^2$ signal, and the null BurstB$^2$ signal from the asynchronous demodulation module; and means for outputting a position error signal (PES) based on the radial position signal, the first null burst squared signal, and the second null burst squared signal.

20. The one or more processing devices of claim 17, wherein the asynchronous demodulation module further comprises means for outputting the radial position signal such that the radial position signal covers substantially a full servo track, from a minus substantially half-track position signal to a plus substantially half-track position signal for substantially the full servo track, corresponding to a minus substantially half-track position of the full servo track to a plus substantially half-track position of the full servo track, and such that the radial position signal is free of stitching points across substantially the full servo track.

* * * * *